United States Patent

Mossi et al.

[11] Patent Number: 5,880,534
[45] Date of Patent: Mar. 9, 1999

[54] SEQUENCING SYSTEM FOR VARIABLE LEVEL OUTPUT INFLATORS

[75] Inventors: G. Dean Mossi, Roy; Marcus T. Clark, Kaysville, both of Utah

[73] Assignee: Autoliv ASP, Inc., Ogden, Utah

[21] Appl. No.: 895,011

[22] Filed: Jul. 16, 1997

[51] Int. Cl.⁶ .................................................. B60R 21/26
[52] U.S. Cl. .................... 307/10.1; 102/202.6; 180/282; 280/735
[58] Field of Search ...................................... 307/10.1, 9.1, 307/121; 180/282, 271; 280/729, 734–736, 741; 340/436, 438, 669; 701/36, 45–47; 102/202.5, 202.6, 202, 275.11, 276

[56] References Cited

U.S. PATENT DOCUMENTS

| | | | |
|---|---|---|---|
| 3,966,224 | 6/1976 | Campbell et al. | 280/235 |
| 3,972,545 | 8/1976 | Kirchoff et al. | 280/735 |
| 4,007,685 | 2/1977 | Nimylowycz | 102/39 |
| 4,213,635 | 7/1980 | Inokuchi et al. | 280/737 |
| 4,358,998 | 11/1982 | Schneiter et al. | 102/530 |
| 4,998,751 | 3/1991 | Paxton et al. | 280/741 |
| 5,033,390 | 7/1991 | Minert et al. | 102/530 |
| 5,109,772 | 5/1992 | Cunningham et al. | 102/275.11 |
| 5,221,109 | 6/1993 | Marchant | 280/736 |
| 5,398,966 | 3/1995 | Hock | 280/736 |
| 5,613,702 | 3/1997 | Gortz | 280/235 |

Primary Examiner—Richard T. Elms

[57] ABSTRACT

A sequencing system is provided for varying the output of an inflator in a vehicle safety restraint system. The inflator has a housing including at least one combustion chamber. Gas generant for producing an inflation gas is disposed in the housing. Ignition material for igniting the gas generating means is disposed in the at least one combustion chamber. A first electric squib is disposed in the inflator housing for initially igniting the ignition material. At least one additional electric squib is disposed in the inflator housing for further igniting the ignition material. A delay sequencing unit is disposed outside of the inflator housing for activating the at least one additional electric squib after a predetermined time from the activation of the first electric squib. Upon activation of the first electric squib by an electrical pulse, an initial amount of inflation gas is generated and the electrical pulse is also received by the delay sequencing unit. After the predetermined time the electrical pulse is allowed to flow to the at least one additional electric squib and an additional amount of inflation gas is generated.

2 Claims, 3 Drawing Sheets

SEQUENCING SYSTEM FOR VARIABLE LEVEL OUTPUT INFLATORS

BACKGROUND OF THE INVENTION

1. Field of the Invention

The present invention relates to a sequencing system and method for varying the output of airbag inflators, and more particularly, to a system and method for sequencing two or more initiators in an airbag inflator.

2. Description of the Related Art

Current airbag inflation technology employs rapidly expanding gases to inflate an airbag in order to reduce occupant injury. However, to prevent injury to an occupant, especially a child, the airbag should initially deploy slowly such that the occupant is pushed backward into the seat. Then after an appropriate delay, if necessary, the bag can be expanded more rapidly to further protect the occupant. A graph of pressure vs. time performance that will produce an initial gentle but firm inflation followed by a rapid inflation is commonly known as an S-curve, as illustrated in FIG. 1.

In order to produce such S-curve parameters variable stage inflators which tailor the mass flow and total gas output of the airbag inflation device are used to vary the level of inflation.

One manner of varying inflation levels is to employ separate chambers within the inflator that are capable of being activated either individually or in sequence by an individually associated initiator or squib to affect the desired gas flow rates. See U.S. Pat. No. 4,998,751, assigned to the assignee of the present invention. The preferred method of activation is by an electrical signal that is sent through a squib in each of the separate chambers. One disadvantage with such a manner of activation is the complexity and expense of the external electronic hardware required to support the proper firing of the various squibs.

U.S. Pat. No. 4,213,635 discloses a dual combustion chamber airbag system wherein a delayed ignition signal generator disposed in a first chamber in response to the pressure therein activates a second ignitor to increase inflation. The generator is a mechanical device located within the inflator whose delay is determined by the tension of a spring or frictional force of an activator. Thus, not only are two combustion chambers required, but the effectiveness of the generator is dependent on a potentially unreliable delay mechanism.

Another method of varying the rate of inflation of an airbag is disclosed by U.S. Pat. No. 3,972,545, assigned to the assignee of the present invention. The inflator is divided into two chambers by a partition. Each of the chambers contain gas generant material ignitable by an individually associated initiator or squib. An impact sensor determines whether one or both of the squibs are fired on impact, and hence, the rate at which the airbag is filled with gas. If the impact is severe, both squibs will be fired. However, if the impact is less severe, only the downstream squib will be fired. The combustion of the downstream squib will proceed upstream through the partition to ignite the gas generant in the upstream chamber, the downstream squib in effect igniting both chambers of generant material. Thus, the electrical hardware is not designed to fire the second squib after a predetermined delay.

U.S. Pat. No. 4,358,998, assigned to the assignee of the present invention, discloses an igniter assembly which is operable to cause the combustible gas generant material in a single combustion chamber to ignite in a progressive manner so as to effect inflation of the gas bag slowly initially but more rapidly later as inflation progresses. The igniter assembly includes a solid propellant disc between two portions thereof whereby the gas generant material disposed around one portion is ignited immediately, and then, after burn through of the disc, the gas generant material disposed around the other portion is ignited. The time required to burn through the disc is the delay time.

Although the above discussed prior art provides a controlled inflation rate for an airbag, there is still a need for a less complex and inexpensive system for a variable inflation rate.

SUMMARY OF THE INVENTION

An object of the present invention is to inexpensively and reliably sequence initiator activation in an airbag inflator to vary the output of the inflators.

Another object of the present invention is to provide an automotive airbag inflation system which has a variable level output capability that can be pre-wired to the inflator/module assembly with simple hardware to achieve a fixed delay between two or more initiators or squibs of the inflator.

A further object of the present invention is to provide a drop-in replacement for existing, single stage inflators because no extra wiring is required in the vehicle to support the system. The present system can be used with existing circuitry within a vehicle with no special adaptations.

Still another object of the present invention is to provide a variable level output system which can effectively simulate the more complex electronic systems used to sequence squibs without the cost and complexity associated with such systems.

In accomplishing these and other objectives of the present invention, there is provided a sequencing system for varying the output of an inflator in a vehicle safety restraint system. The inflator has a housing including at least one combustion chamber. Means for generating an inflation gas are disposed in the housing. Ignition means for igniting the gas generating means are disposed in the at least one combustion chamber. A first electric squib is disposed in the inflator housing for initially igniting the ignition means. At least one additional electric squib is disposed in the inflator housing for further igniting the ignition means. A delay sequencing unit is disposed outside of the inflator housing for activating the at least one additional electric squib after a predetermined time from the activation of the first electric squib. Upon activation of the first electric squib by an electrical pulse, an initial amount of inflation gas is generated and the electrical pulse is delivered to the delay sequencing. After the predetermined time the electrical pulse is forwarded to the at least one additional electric squib and an additional amount of inflation gas is generated.

The system of the present invention represents an improvement over prior art designs that require multi-level inflation technology which are supported by additional, in-vehicle electronics. The system of the present invention realizes the advantages to be gained with a variable level inflator without the significant additional expense.

Other features and advantages of the present invention will become apparent from the following description of the invention which refers to the accompanying drawings.

DETAILED DESCRIPTION OF THE PREFERRED EMBODIMENTS

Figure 1:
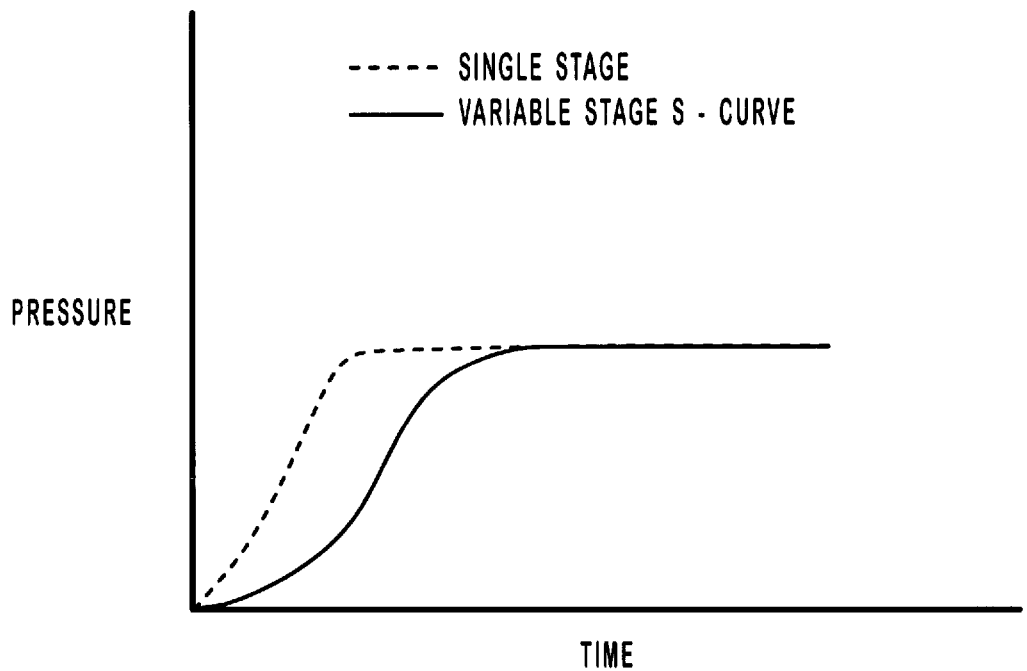
FIG. 1 is a known pressure-time comparison of automotive airbag inflators.
Figure 2:
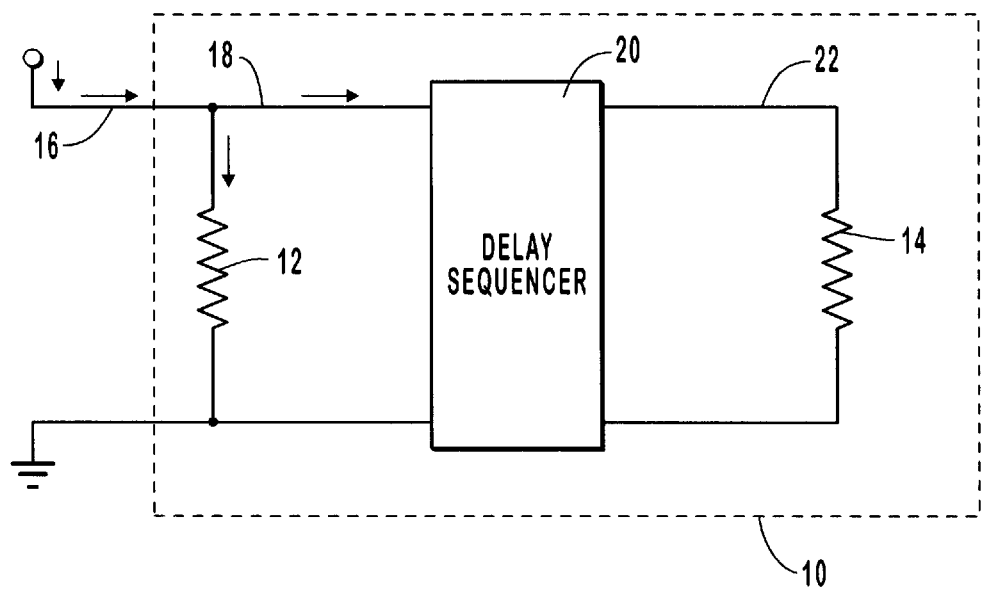
FIG. 2 is a schematic illustration of the sequencing system of the present invention.

The present invention provides a system and method for sequencing two or more squibs in an inflator of an airbag. Referring to FIG. 2, a first initiator or squib 12 is wired in parallel with a second squib 14. A delay sequencing unit 20, which will be described further herein, is placed electrically between squibs 12 and 14.

Upon a collision, current is sent to the inflator from the vehicle's crash sensor (not shown) via a lead 16 and is immediately routed through the first squib 12 which is then activated.

The delay sequencing unit 20 also senses this electrical current pulse via a lead 18 and begins a delay sequence. After a preset, finite period of time, the unit allows the current to flow to the second squib 14 via lead 22. This sequence can be repeated any number of times, as is required by the number of squibs present in the inflator. A fuse or fusible link 24, which melts after a predetermined amount of current passes therethrough, ensures that the cicuit leg of first squib 12 opens after firing.

Figure 3:
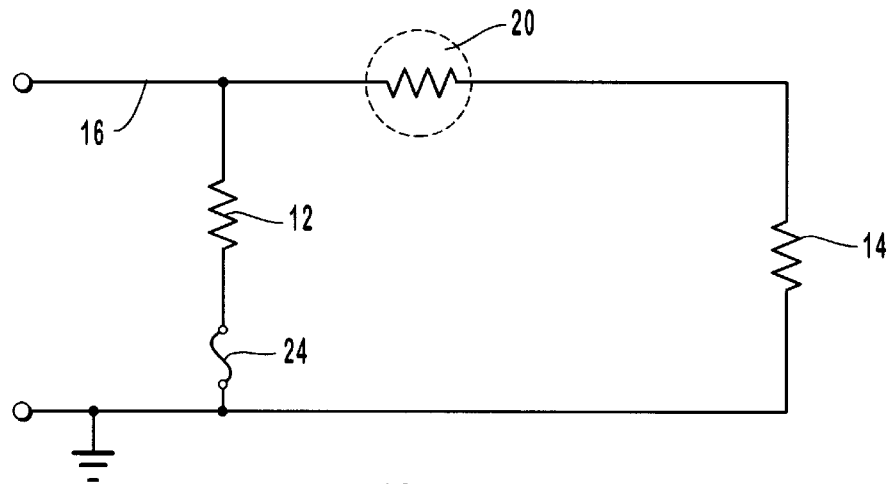
FIG. 3 is a schematic illustration of one embodiment of the delay sequencing unit of the present invention.
Figure 4:
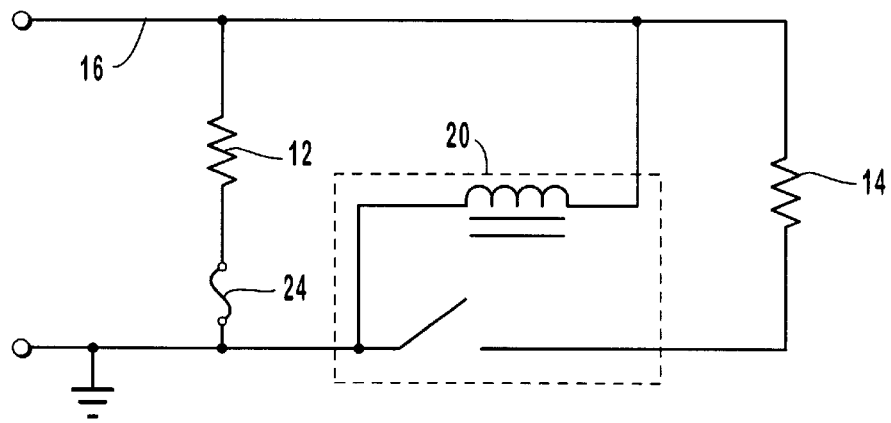
FIG. 4 is a schematic illustration of a second embodiment of the delay sequencing unit of the present invention.
Figure 5:
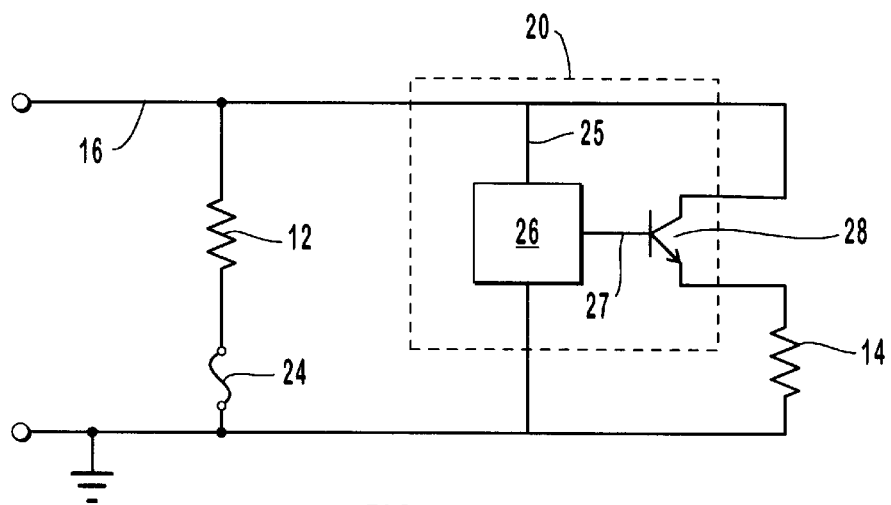
FIG. 5 is a schematic illustration of another embodiment of the delay sequencing unit of the present invention.

As shown in FIGS. 3–5, delay sequencing unit 20, shown by dashed line, can be made of components which capture and store the charge delivered via lead 18 for the preset time.

For example, as shown in FIG. 3, delay sequencing unit 20 can utilize a negative temperature coefficient (NTC) thermistor in the configuration illustrated. Referring to FIG. 4, sequencing unit 20 can include a relay and closure delay as shown. In FIG. 5, sequencing unit 20 can utilize an integrated circuit timer 26 and switching transistor 28. Current enters circuit timer 26 via lead 25 and exits via lead 27. It should be appreciated that other known electronic components can be used to store the current in unit 20 for the predetermined time.

The delay time is individually predetermined at the time of manufacture and subsequently cannot be altered. The charge hold or delay can be in the range of, for example, 0 to 20 milliseconds. However, the present invention should not be limited to a maximum delay of 20 ms.

After the predetermined delay time the current is released and travels via lead 22 to the secondary squib 14 which fires and increases the output of the inflator.

In summary, when a collision occurs, the crash sensing system of the vehicle sends an electrical pulse to squib 12 which fires igniting the ignition material which in turn burns the gas generant material to release an initial amount of inflation gas from the inflator. The pulse is also received by the delay sequencing unit 20. The delay time is preset and fixed. When the time requirement is met by the unit, the current pulse is allowed to flow through the second squib 14 which then activates the remaining fuel of the inflator to cause an additional, larger output of inflation gas.

Unit 20 can be harnessed directly to the existing hardware of an inflator because no extra wiring is necessary. Therefore, the inflator 10, which incorporates unit 20 and associated leads, can be a drop-in replacement in existing inflator applications.

Figure 6:
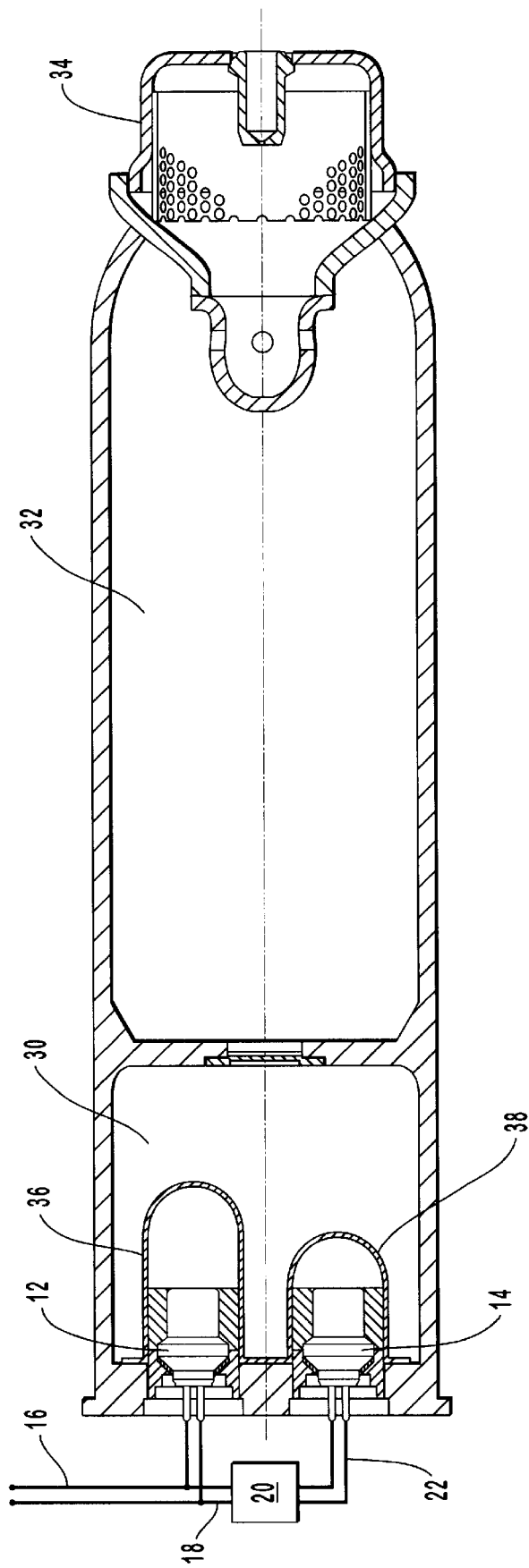
FIG. 6 is a cross-sectional view of an inflator incorporating the sequencing system of the present invention.

Referring to FIG. 6, the variable level inflation output system of the present invention can be used in an inflator having a single combustion chamber and at least two initiators or squibs. FIG. 6 illustrates a fluid fueled inflator 10. It should be appreciated that the present invention is not limited to a fluid fueled inflator but could also be used in a pyrotechnic inflator, as well as an inflator having two or more combustion chambers. Moreover, further structural details and operation of the inflator do not form a part of the present invention and will not be described in detail herein.

As shown in FIG. 6, the inflator 10 includes a combustion chamber 30, a gas storage chamber 32 and a diffuser assembly 34. The first squib 12 is disposed in combustion chamber 30 in association with a primary fuel bottle 36. Squib 12 is wired to the vehicle collision sensor(s) (not shown) via lead 16. Squibs 12 and 14 are also coupled to ground. The secondary squib 14, associated with a secondary fuel bottle 38 is connected through delay sequencing unit 20 and leads 18, 22.

Within the combustion chamber 30 is one or more fluid fuels and one or more oxidants forming a flammable mixture. After the first squib 12 is fired, the fluid fuel in the combustion chamber 30 reacts and burns with the oxidant and the gas in storage chamber 32 to produce the gaseous inflation products. Under certain circumstances it is advantageous to fire second squib 14 after a predetermined delay to produce additional inflation gas.

The secondary fuel bottle 38 includes a self-oxidizing fuel. When the secondary squib is fired, this fuel is combusted and the rate of gas output is increased. Such an adaptive output fluid fueled inflator is described in copending patent application Ser. No. 08/810,118, entitled "Adaptive Output Fluid Fueled Airbag Inflator", assigned to the assignee of the present invention.

It should be understood that the invention described above is applicable to a variety of kinds of inflators, for example, driver, passenger or side impact airbag assemblies.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sequencing system for varying the output of an inflator in a vehicle safety restraint system, comprising:

an inflator having a housing, the housing including at least one combustion chamber;

means for generating an inflation gas disposed in the housing;

ignition means disposed in the at least one combustion chamber for igniting the gas generating means;

a first electrical squib disposed in the inflator housing for initially igniting the ignition means;

at least one additional electric squib disposed in the inflator housing for further igniting the ignition means; and a delay sequencing unit, including a negative temperature coefficient thermistor, disposed outside of the inflator housing for activating said at least one additional electric squib after a predetermined time from the activation of the first electric squib, wherein upon activation of the first electric squib by an electrical pulse an initial amount of inflation gas is generated and the electrical pulse is delivered to the delay sequencing unit and after the predetermined time the electrical pulse is forwarded to the at least one additional electrical squib and an additional amount of inflation gas is generated.

2. A sequencing system for varying the output of an inflator in a vehicle safety restraint system, comprising:

an inflator having a housing, the housing including at least one combustion chamber;

means for generating an inflation gas disposed in the housing;

ignition means disposed in the at least one combustion chamber for igniting the gas generating means;

a first electrical squib disposed in the inflator housing for initially igniting the ignition means;

at least one additional electric squib disposed in the inflator housing for further igniting the ignition means; and a delay sequencing unit, including a relay, disposed outside of the inflator housing for activating said at least one additional electric squib after a predetermined time from the activation of the first electric squib, wherein upon activation of the first electric squib by an electrical pulse an initial amount of inflation gas is generated and the electrical pulse is delivered to the delay sequencing unit and after the predetermined time the electrical pulse is forwarded to the at least one additional electrical squib and an additional amount of inflation gas is generated.

* * * * *